(12) United States Patent
Mateescu et al.

(10) Patent No.: US 7,720,953 B2
(45) Date of Patent: May 18, 2010

(54) SYSTEM AND METHOD OF DATA SOURCE DETECTION

(75) Inventors: Daniel Mateescu, Toronto (CA); Michael Shenfield, Richmond Hill (CA); Bryan R. Goring, Milton (CA); David Debruin, Guelph (CA); Michael V. Cacenco, Brampton (CA)

(73) Assignee: Research In Motion Limited, Waterloo, Ontario (CA)

( * ) Notice: Subject to any disclaimer, the term of this patent is extended or adjusted under 35 U.S.C. 154(b) by 728 days.

(21) Appl. No.: 11/405,509

(22) Filed: Apr. 18, 2006

(65) Prior Publication Data

US 2007/0002689 A1    Jan. 4, 2007

Related U.S. Application Data

(60) Provisional application No. 60/672,043, filed on Apr. 18, 2005.

(51) Int. Cl.
*G06F 15/173* (2006.01)
(52) U.S. Cl. .................................... 709/223
(58) Field of Classification Search ................ 709/223; 707/100
See application file for complete search history.

(56) References Cited

U.S. PATENT DOCUMENTS

| 2004/0117393 | A1* | 6/2004 | DeMesa et al. ............. 707/100 |
| 2005/0033725 | A1  | 2/2005 | Potter et al. |
| 2005/0071448 | A1* | 3/2005 | Katz et al. .................. 709/223 |

FOREIGN PATENT DOCUMENTS

| EP | 0863638 | 9/1998 |
| WO | WO 03/098460 A | 11/2003 |

OTHER PUBLICATIONS

PCT International Search Report and Written Opinion mailed Aug. 1, 2006 for corresponding PCT Application No. PCT/CA2006/000600.

* cited by examiner

*Primary Examiner*—Ario Etienne
*Assistant Examiner*—Hee Soo Kim
(74) *Attorney, Agent, or Firm*—Mark Sprigings

(57) ABSTRACT

A data source detection method and system for detecting data sources are provided. The data source detection system comprises a generic data source connector for connecting to a data source, a data source connectors repository for storing the location of the data source and a data source model for representing information contained in the data source. The method comprises the steps of reading a data source connector repository, locating and connecting to a data source connector of a data source and building a data source model of the data source.

7 Claims, 6 Drawing Sheets

SYSTEM AND METHOD OF DATA SOURCE DETECTION

This non-provisional application claims the benefit of U.S. Provisional Application No. 60/672,043 filed Apr. 18, 2005, which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present patent disclosure relates generally to a communications system for providing communications to a plurality of devices and specifically to a system and method of data source detection.

BACKGROUND OF THE INVENTION

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

A wireless handheld device has limited battery power, memory and processing capacity. Since communication on a device is very expensive in terms of energy consumption, it is desirable to minimize message traffic to and from the device as much as possible.

With the emerging importance of Web services in the IT business, more and more IT actors are providing a standardized access to their business through the Web services. However, in the IT landscape there is still a huge number of applications not exposing information through Web services, but relying instead on different data sources: databases, CORBA applications, etc.

Mobile applications can be used for integrating various data source. The traditional development of wireless applications is highly impacted by the nature of the data sources the wireless application communicates with. The connection infrastructure to a specific data source (database, Web service, etc) has to be built inside the wireless application itself, consuming the valuable wireless resources.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

Figure 1:
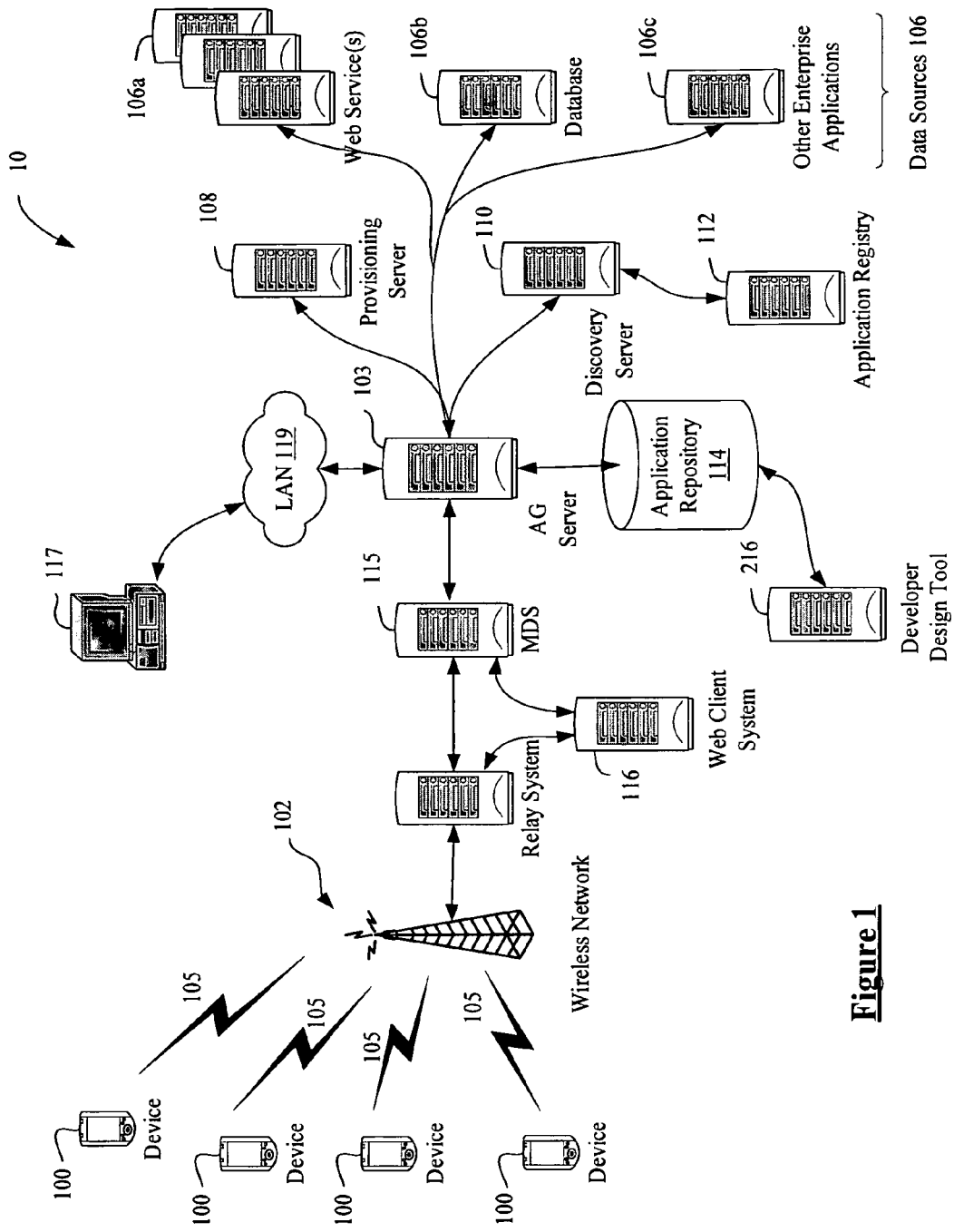
FIG. 1 is a schematic diagram of an example of a communication network system.

This patent disclosure provides a wireless application with a convenient way of connecting to various data sources in a generic manner, allowing the wireless application to discover dynamically the specific data source connectors.

In accordance with an embodiment of the present patent disclosure, there is provided a data source detection system for detecting data sources. The data source detection system comprises a generic data source connector for connecting to a data source connector of a data source, a data source connectors repository for storing the location of the data source and a data source model for representing information contained in the data sources.

In accordance with another embodiment of the present patent disclosure, there is provided a method of data source detection. The method comprises the steps of reading a data source repository, locating and connecting to a data source connector of a data source and building a data source model of the data source.

In accordance with another embodiment of the present patent disclosure, there is provided a computer-readable medium storing instructions or statements for use in the execution in a computer of a method of data source detection. The method comprises the steps of reading a data source connector repository, locating and connecting to a data source connector of a data source, and building a data source model of the data source.

In accordance with another embodiment of the present patent disclosure, there is provided a propagated signal carrier carrying signals containing computer-executable instructions that can be read and executed by a computer. The computer-executable instructions being used to execute a method of data source detection. The method comprises the steps of reading a data source connector repository, locating and connecting to a data source connector of a data source, and building a data source model of the data source.

Advantageously, the data source detection system mitigates the resource overhead induced by data source-specific access processing when a wireless application connects to various data sources.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

Referring to FIG. 1, a network system 10 comprises mobile communication devices 100 for interacting with one or more back-end data sources 106 (e.g., a schema-based service such as Web service or database that provides enterprise services used by an application 105) via a wireless network 102 coupled to an application gateway (AG). The devices 100 are devices such as but not limited to mobile telephones, PDAs, two-way pagers, and dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the AG and data sources 106 can be linked via extranets (e.g., the Internet) and/or intranets as is known in the art. The AG handles request/response messages initiated by the application 105 as well as subscription notifications pushed to the device 100 from the data sources 106. The AG can function as a Data Mapping Server for mediating messaging between a client runtime RE on the device 100 and a back-end server of the data sources 106. The Runtime Environment (RE) is an intelligent container that executes application 105 components and provides common services as needed for execution of the applications 105. The AG can provide for asynchronous messaging for the applications 105 and can integrate and communicate with legacy back-end data sources 106. The devices 100 transmit and receive wireless component applications technology or wireless component applications 105, as further described below, when in communication with the data sources 106, as well as transmit/receive messaging associated with operation of the applications 105. The devices 100 can operate as Web clients of the data sources 106 through execution of the applications 105 when provisioned on respective runtime environments RE of the devices 100.

For satisfying the appropriate messaging associated with the applications 105, the AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to call a method of an object (or a function). It is recognized that the applications 105 can be downloaded/uploaded in relation to data sources 106 via the network 102 and AG directly to the devices 100. For example, the AG is coupled to a provisioning server 108 and a discovery server 110 for providing a mechanism for optimized over-the-air provisioning of the applications 105, including capabilities for application 105 discovery from the device 100 as listed in a Universal Description Discovery and Integration (UDDI) (for example) registry 112. The registry 112 can be part of the discovery service implemented by the server 110, and the registry 112 is used for publishing the applications 105. The application 105 information in the registry 112 can contain such as but not limited to a deployment descriptor DD (contains information such as application 105 name, version, and description) as well as the location of this application 105 in an application repository 114.

Referring again to FIG. 1, for initialization of the RE, the RE receives the AG URL and the AG public key in an MDS 115 service book. The RE uses this information to connect to the AG for initial handshaking. Device 100 provisioning or email redirector 116, depending on the domain, pushes the MDS 115 service book to the device 100. It is recognised there could be more than one AG in the network 10, as desired. Once initialized, access to the applications 105 by the devices 100, as downloaded/uploaded, can be communicated via the AG directly from the application repository 114, and/ or in association with data source 106 direct access (not shown) to the repository 114.

Referring to FIG. 1, the applications 105 can be stored in the repository 114 as a series of packages that can be created by a developer design tool 216, which is employed by developers of the applications 105. The developer design tool 216 can be a RAD tool used to develop the wired and/or wireless component application 105 packages. The tool 216 can provide support for a drag-and drop graphical approach for the visual design of application 105 components such as but not limited to screens, data elements, messages and application workflow logic. The application 105 packages are represented as structured data (XML) that can be generated automatically by the tool 216 through an automatic code generation process. This tool 216 can provide for the automatic generated code to include or be otherwise augmented by an industry standard scripting language (e.g., JavaScript) or other scripting/programming languages known in the art. The availability of the application 105 packages of the repository 114 are published via the discovery service of the server 110 in the registry 112. It is recognized that there can be more than one repository 114 and associated registries 112 as utilized by the particular network 10 configuration of the AG and associated data sources 106.

Figure 2:
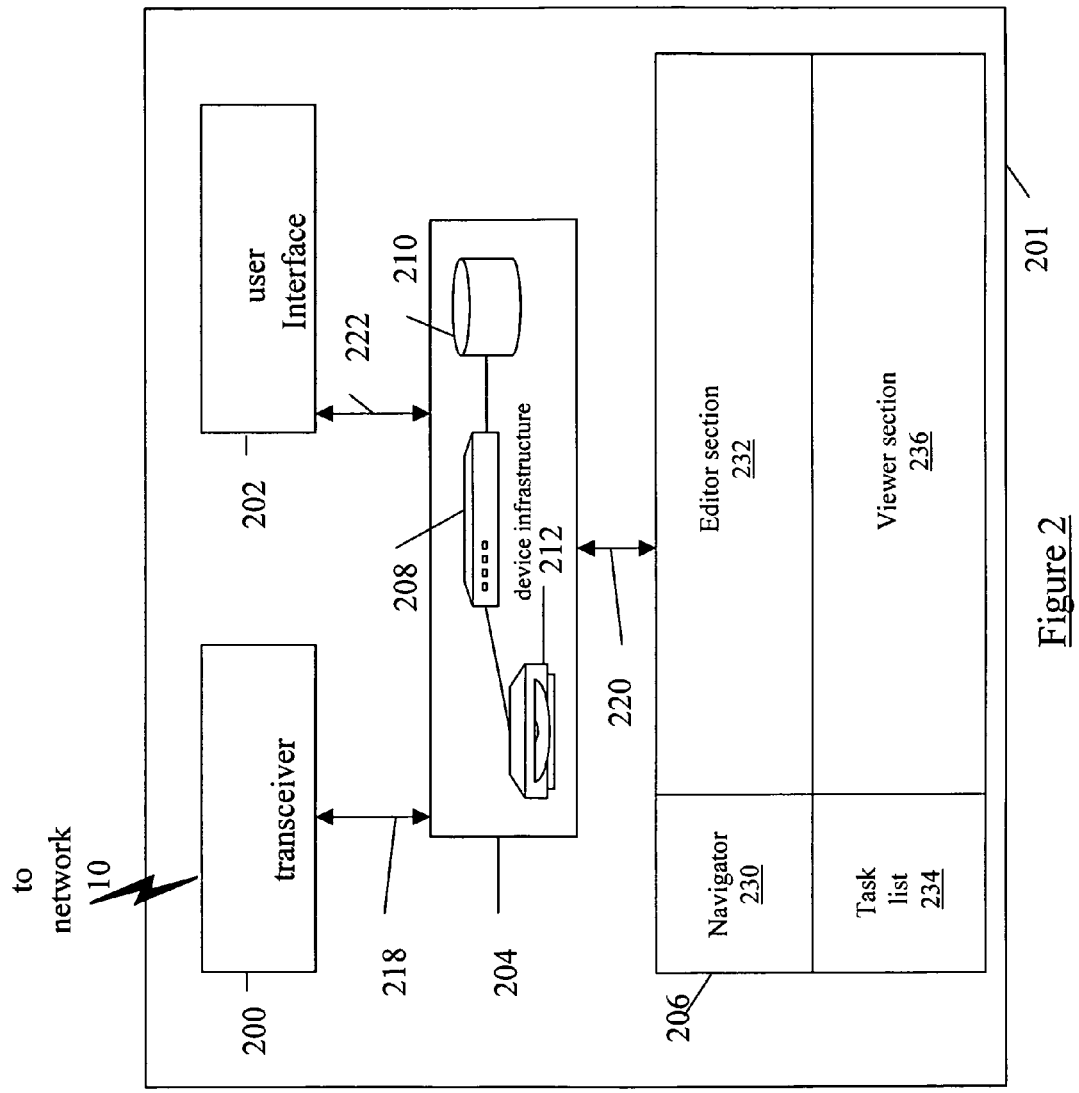
FIG. 2 is a component diagram of an example of a tool for developing and generating the applications of FIG. 1.

Referring to FIG. 2, the tool 216 is operated on a computer 201 that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the developer design tool 216 also has a user interface 202, coupled to the device infrastructure 204 by connection 222, to interact with a user (not shown). The user interface 202 includes one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the tool 216 to coordinate the design of applications 105 using a series of editors 300 and viewers 302 (see FIG. 3), using a plurality of wizards 304 to assist in or drive the workflow of the development process.

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the tool 216 by executing related instructions, which are provided by an operating system and application 105 design editors 300, wizards 304, dialogs 305 and viewers 302 resident in the memory module 210. Further, it is recognized that the device infrastructure 204 can include a computer-readable storage medium 212 coupled to the processor 208 for providing instructions to the processor 208 and/or to load/design the applications 105 also resident (for example) in the memory module 210. The computer-readable medium 212 can include hardware and/or software such as, by way of example only, magnetic disks, magnetic tape, optically readable medium such as CD/DVD ROMs, and memory cards. In each case, the computer-readable medium 212 may take the form of a small disk, floppy diskette, cassette, hard disk drive, solid state memory card, or RAM provided in the memory module 210. It should be noted that the above-listed example computer-readable mediums 212 can be used either alone or in combination.

Referring again to FIG. 2, the design tool 216 is operated on the computer 201 as an application development environment for developing the applications 105. The development methodology of the tool 216 can be based on a visual "drag and drop" system of building the application visual, data, messaging behaviour, and runtime navigation model. The tool 216 can be structured as a set of plug-ins to a generic integrated design environment (IDE) framework, such as but not limited to the Eclipse (™) framework, or the tool 216 can be configured as a complete design framework without using plug-in architecture. For exemplary purposes only, the tool 216 will now be described as a plug-in design environment using the Eclipse framework.

Figure 3:
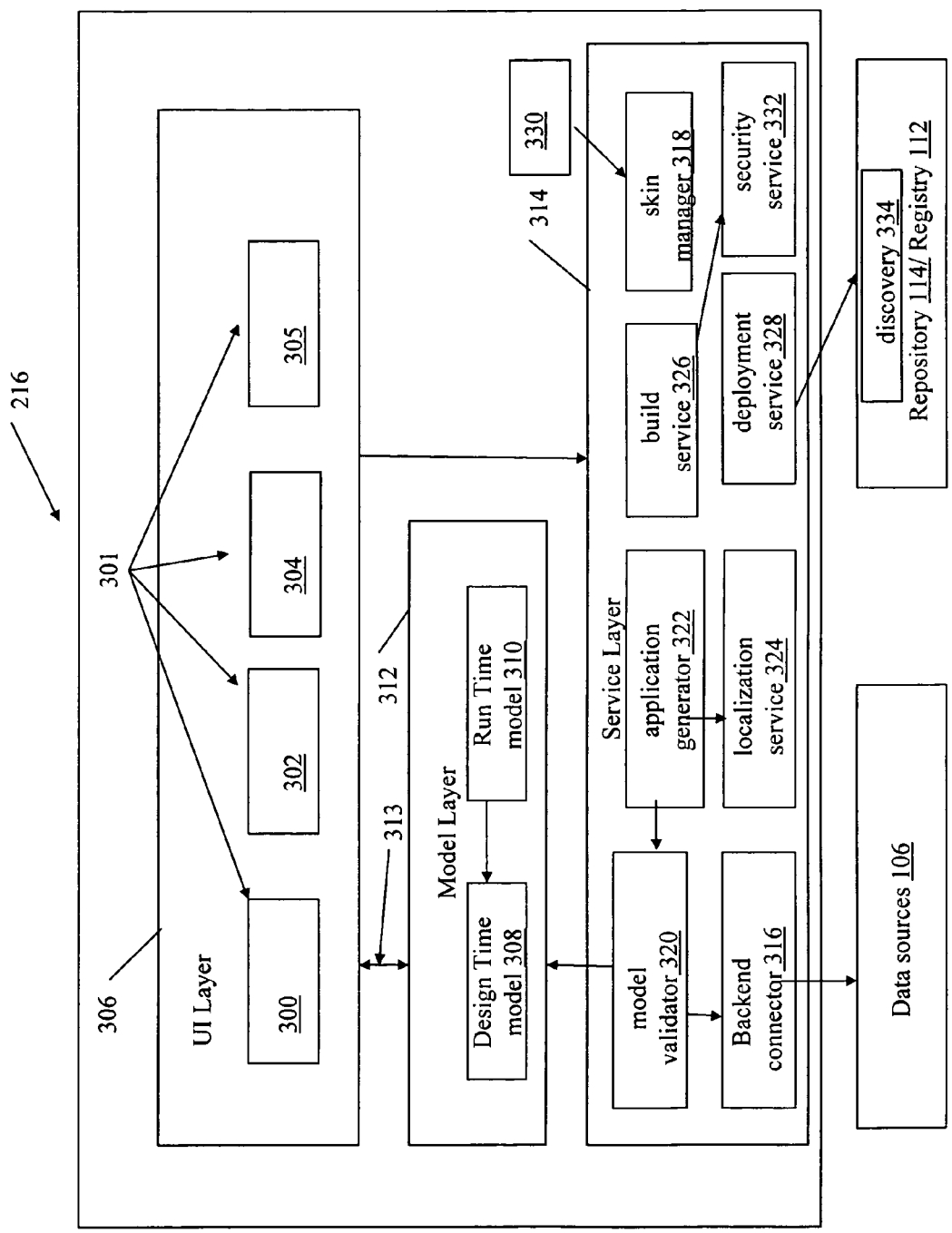
FIG. 3 is a component diagram of an example of the tool architecture of FIG. 2.

Referring to FIGS. 2 and 3, Eclipse makes provisions for a basic, generic tool 216 environment that can be extended to provide custom editors, wizards, project management and a host of other functionality. The Eclipse Platform is designed for building integrated development environments (IDEs) that can be used to create applications as diverse as Web sites, embedded Java (™) programs, C++ programs, and Enterprise JavaBeans (™). The navigator view 230 shows files in a user's (e.g., developer) workspace; a text editor section 232 shows the content of a file being worked on by the user of the tool 216 to develop the application 105 and associated components in question; the tasks view section 234 shows a list of to-dos for the user of the tool 216; and the outline viewer section 236 shows for example a content outline of the application 105 being designed/edited, and/or may augment other views by providing information about the currently selected object such as properties of the object selected in another view. It is recognised that the tool 216 aids the developer in creating and modifying the coded definition content of the components in the structured definition language (e.g., in XML). Further, the tool 216 also aids the developer in creating, modifying, and validating the interdependencies of the definition content between the components, such as but not limited to message/data and screen/data relationships. It is also recognised that presentation on the display of wizard 304 and dialog 305 content for use by the developer (during use of the editors 300 and viewers 302) can be positioned in one of the sections 230, 232, 234, 236 and/or in a dedicated wizard section (not shown), as desired.

The Eclipse Platform is built on a mechanism for discovering, integrating, and running modules called plug-ins (i.e., editors 300 and viewers 302). When the Eclipse Platform is launched via the UI 202 of the computer 201, the user is presented with an integrated development environment (IDE) on the display 206 composed of the set of available plug-ins, such as editors 300 and viewers 302. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The Eclipse Platform UI paradigm is based on editors, views, and perspectives. From the user's standpoint, a workbench display 206 consists visually of views 302 and editors 300. Perspectives manifest themselves in the selection and arrangements of editors 300 and views 302 visible on the display 206. Editors 300 allow the user to open, edit, and save objects. The editors 300 follow an open-save-close lifecycle much like file system-based tools. When active, a selected editor 300 can contribute actions to a workbench menu and tool bar. Views 302 provide information about some object that the user is working with in the workbench. A viewer 302 may assist the editor 300 by providing information about the document being edited. For example, viewers 302 can have a simpler lifecycle than editors 300, whereby modifications made in using a viewer 302 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 302 and editors 300 that are arranged (tiled, stacked, or detached) for presentation on the display 206.

FIG. 3 illustrates an overall designer tool structure for designing component applications, illustrated generally by numeral 216. In the present embodiment, the designer tool (or design tool) is implemented using the Eclipse Platform, or Eclipse. Eclipse is designed to support the construction of a variety of tools for application development. Further, Eclipse supports an unrestricted set of tool providers, including independent software vendors (ISVs) as well as tools for manipulating arbitrary content types (for example HTML, Java, C, JSP, EJB, XML, and GIF). Eclipse supports both GUI and non-GUI-based application development environments.

Eclipse's principal role is to provide tool providers with mechanisms to use, and rules to follow, that lead to seamlessly-integrated tools. These mechanisms are exposed via well-defined API interfaces, classes, and methods. Eclipse also provides useful building blocks and frameworks that facilitate developing new tools.

Eclipse comprises a plug-in architecture, wherein a plug-in is the smallest unit that can be developed and delivered separately. Usually a small tool is written as a single plug-in, whereas a complex tool has its functionality split across several plug-ins. Plug-ins are coded in Java and a typical plug-in consists of Java code in a JAR library, some read-only files, and other resources such as images, Web templates, message catalogs, native code libraries, and the like.

Each plug-in has a manifest file declaring its interconnections to other plug-ins. In order to define interconnections a plug-in declares any number of named extension points, and any number of extensions to one or more extension points in other plug-ins. Eclipse is a well-known environment, and these and other features are thoroughly described at www.eclipse.org.

In the present embodiment, Eclipse is used to enable a developer to design a component application. A component application is an application defined generally by a structured set of components, including data components, message components, presentation components and workflow components. The components are defined using a structured language and executed on a client device by an intelligent runtime container.

The data components define data entities that are used by the component application program. Examples of data entities include orders, users, and financial transactions. Data components define what information is required to describe the data entities, and in what format the information is expressed. For example, the data component may define an order comprising a unique identifier for the order, which is formatted as a number; a list of items, which are formatted as strings; the time the order was created, which has a date-time format; the status of the order, which is formatted as a string; and a user who placed the order, which is formatted according to the definition of another one of the data components. Since data elements are usually transferred by message, there is often persistence of data components in a database. Data components may be dynamically generated or defined by the application designer.

The message components define the format of messages used by the component application program to communicate with external systems such as the Web service. For example, one of the message components may describe a message for placing an order, which includes a unique identifier for the order, a status of the order, and notes associated with the order.

The presentation components define the appearance and behaviour of the component application program as it displayed to a user via a user interface. The presentation components can specify graphical user interface (GUI) screens and controls, and actions to be executed when the user interacts with the component application. For example, the presentation components may define screens, labels, edit boxes, buttons and menus, and actions to be taken when the user types in an edit box or pushes a button.

The workflow components of the component application program define processing that occurs when an action is to be performed, such as an action specified by a presentation component as described above, or an action to be performed when messages arrive. Presentation workflow and message processing are defined by the workflow components. The workflow components are written as a series of instructions in either metadata or a programming language or a scripting language. The workflow component supports a correlation between message components and defines application flow as a set of rules for operations on other components.

More details regarding component application can be found in Patent Cooperation Treaty Application Numbers PCT/CA2003/001976, PCT/CA2003/001980 and PCT/CA2003/001981, titled "System and Method for Building and Execution of Platform-Neutral Generic Services Client Applications", "System and Method of Building Wireless Component Applications" and "System and Method of Creating and Communicating with Component Based Wireless Applications", respectively, which are hereby incorporated by reference.

The design tool 216 comprises a user interface (UI) layer 306, a model layer 312 and a service layer 314. The UI layer 306 primarily comprises a collection of user modules 301, including graphical and text editors, viewers and wizards. A large majority of external interactions are accomplished through one or more of these modules, with the developer using a system of drag-and-drop editing and wizard-driven interaction. A secondary, non-user-facing system interface is that of a back-end connector, whereby the design tool 216 can communicate with various back-end servers 106 such as Web services providers and relational databases for example. As described above, the design tool 216 can be built on the Eclipse platform. Accordingly, the user modules 301 are plug-in modules 301 that extend Eclipse classes and utilize the Eclipse framework.

The UI layer 306 has access to an extensive widget set and graphics library known as the Standard Widget Toolkit (SWT), for Eclipse. Further, the user modules 301 can utilize a higher-level toolkit called JFace that contains standard viewer classes such as lists, trees and tables and an action framework used to add commands to menus and toolbars. The design tool 216 can also use a Graphical Editing Framework (GEF) to implement diagramming editors. The user modules 301 typically follow the Model-View-Controller design pattern where each user module 301 is both a view and a controller.

The data layer 312 includes a design-time model 308 and a runtime model 310 represent the persistent state of the application. The separation of the layers UI layer 306 and the data layer 312 keeps presentation specific information in various views and allows multiple user modules 301 to respond to data model 308,310 changes.

In the present embodiment, the data models 308,310 are based on the Eclipse Modeling Framework (EMF). EMF is a framework and code generation facility. The framework provides model change notification, persistence support and an efficient API for manipulating EMF objects generically. A code generation facility is used to generate the model implementation and create adapters to connect the model layer 312 with the UI layer 306.

The service layer 314 provides services for the UI layer 306 such as validation, localization, generation, build and deployment. The design tool 216 uses Eclipse extension points to load additional plug-ins for two types of services: back-end connectors 316 and device skins 318. The back-end connectors 316 define extension points for facilitating communication with different back-end server 106. The device skin 318 defines an extension point for allowing the design tool 216 to emulate different devices 102.

The UI Layer 306 uses a Model-View-Controller (MVC) pattern where each user module 301 can be both a viewer and a controller. As controllers, user modules 301 interact with the model layer 312 models with some related control logic as defined by the MVC pattern. Editors are and viewers are examples of user modules 301 that commit changes to the models immediately upon implementation. Wizards are user modules 301 that are step-driven by a series of one or more dialog interfaces, wherein each dialog interface gathers specific information from a user of the design tool 216. The wizards 304 apply no changes to the models until confirmation is received, such as selecting a finish button.

As viewers, the user modules 301 are observers of the models and are used to interact or otherwise test and modify the models of the application. When the model data changes, the models are notified and respond by updating the presentation of the application. The design-time model 308 is the current version of the application in development and is accessed by users employing the user modules 301 to interact with the associated data of the design-time model 308. Modules 301 can also trigger validation actions on the design-time model 308. User modules 301 can also cause some or all of the application to be generated from the design-time model 308. In general, the design-time model 308 accepts a set of commands that affects the state of the model 308, and in response may generate a set of events. Each user module 301 includes the set of commands and the events that affect the module 301 and data model 308 pairing.

The design-time model 308 represents the state of an application development project and interacts with the user modules 301 by notifying user modules 301 when the state of the design-time model 308 has changed. The design-time model's 308 primary responsibility is to define an applications, and, accordingly, may include: data component definitions; global variable definitions; message component definitions; resource definitions; screen component definitions; scripts; style definitions. The design-time model 308 responds to commands of each editor and/or viewer. The design-time model 308 also sends events to user modules 301 in response to changes in the design-time model 308, as well as communicating with the other modules 301 when the design-time model 308 has changed.

The following describes the mechanism used by the user modules 301 to interact with the design-time model 308. The design tool 216 uses the EMF.Edit framework provided by Eclipse and generated code as a bridge 313 between the UI layer 306 and the model layer 312. Following the Model-View-Controller pattern, the user modules 301 do not know about the design-time model 308 directly but rely on interfaces to provide the information needed to display and edit the data in the design-time model 308.

For example, a tree viewer uses a TreeContentProvider and LabelProvider interface to query the structure of the tree and get text and icons for each node in the tree respectively. Table viewers and list viewers work in a similar way but use the structured ContentProvider and LabelProvider interfaces.

Each class in the design-time model 308 is a change notifier. That is, anytime an attribute or reference is changed, an event is triggered. In EMF a notification observer is called an adapter because not only does it observe state changes, but it can also extend the behaviour of the class to which it is attached by supporting additional interfaces. An adapter is attached to a model object by an adapter factory. An adapter factory is asked to adapt an object with an extension of a particular type. The adapter factory is responsible for creating the adapter or returning an existing one, the model object does not know about adapting itself.

The design tool 216 uses EMF to generate a set of adapters for the data model 308 called item providers. Each item provider is an adapter that implements provider interfaces to extend the behaviour of the model object so it can be viewed and edited. At the same time is a notification observer that can pass on state changes to listening views. The design tool 216 connects the user modules 301 to the design-time model 308 by configuring them with one or more EMF.Edit classes. Each EMF.Edit class supports an Eclipse UI-provider interface. The EMF.Edit class implements an interface call by delegating an interface call to an adapter factory. The adapter factory then returns a generated adapter that knows how to access the design-time model 308. When the state of the design-time model 308 changes, the same adapters are used to update the user modules.

The following commands are example commands that can affect related modules 301 of the UI layer 306: ComponentAdded—a component has been added to the application; ComponentRemoved—a component has been removed from the application; ComponentRenamed—a component has been renamed; NavigationControlChanged—a button or menu item has been added, been removed or had its properties changed on a screen of the application; DataBindingChanged—a data-bound control has been added, been removed or had its properties changed on a screen; ScreenParameterListChanged—a parameter has been added or removed from one of the screen components; FieldMappingChanged—a message-level, field-level or prototype mapping has changed; MessageContainmentChanged—a containment relationship has changed; MessageFieldChanged—a message field has been added, been removed or had its properties changed for a message and/or a screen component; DataFieldChanged—a data field has been added, been removed or had its properties changed from a message, data and/or screen component; NavigationChanged—a script that may contain navigation code has changed of a workflow component; LocalizedStringChanged—a literal string has been added, been removed or changed; and ExitCodeChanged—Exit code has been added or removed from a script of the workflow component.

Figure 4:
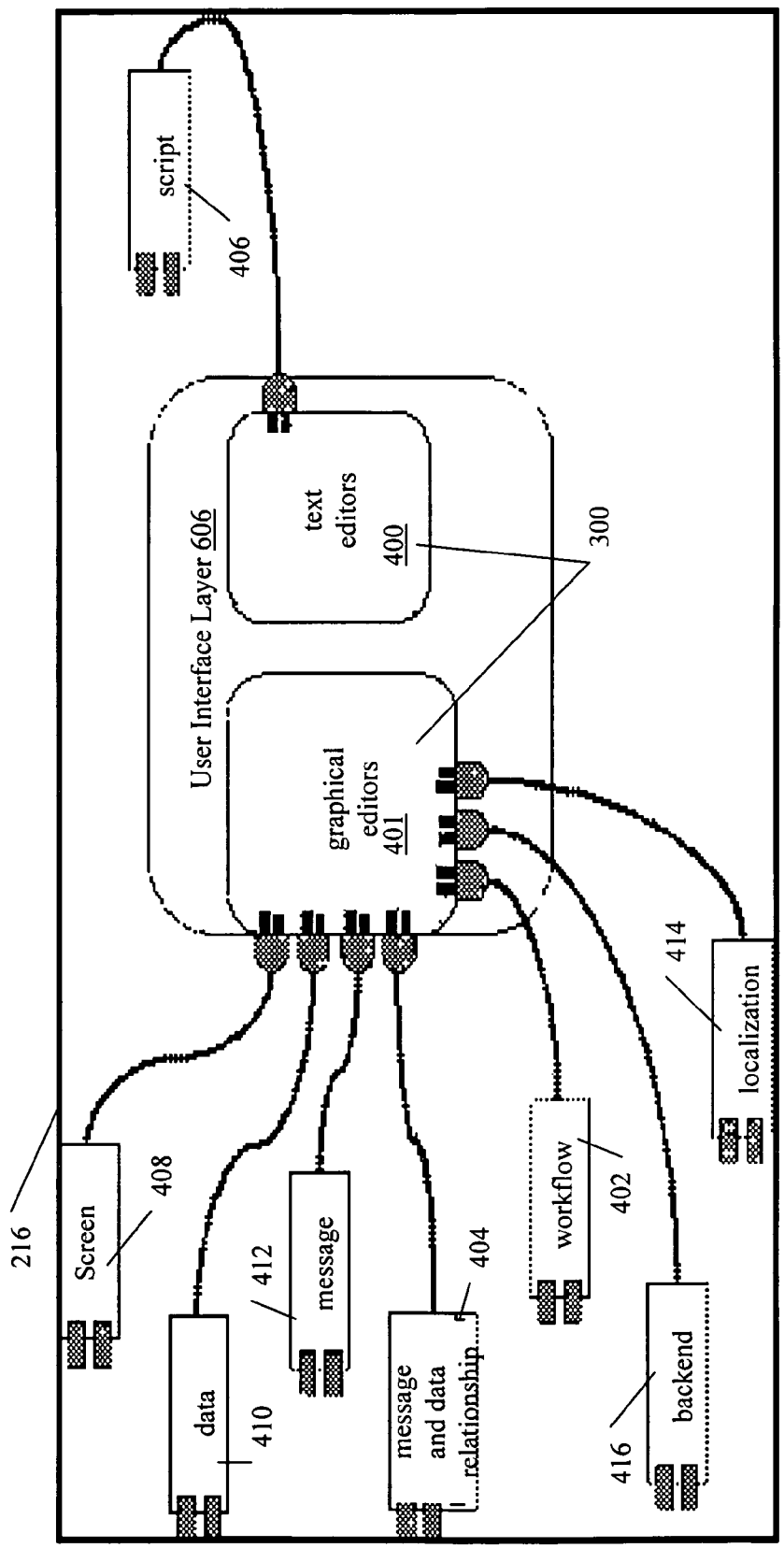
FIG. 4 is a diagram illustrating an example of the distribution of user modules as plug-ins.

Referring to FIG. 4, the distribution of user modules 301 as Eclipse plug-ins is shown. User modules 301 fall broadly into two categories: Text Editors 400, which implement standard line-based editing functionality; and Graphical Editing Framework (GEF) Editors 401 that provide an edit space in which to draw objects. A GEF Editor 401 in the context of the design tool 216 can contain a palette and a canvas, as is known in the art. The user can drop nodes (entities) from the palette onto the canvas and add connections to define relationships therebetween, so as to define the content and inter-relationships of the components of the application. It will be recognized that the user modules 301 are used to create and modify definitions contained in the components as well as to create and modify the interdependencies therebetween. Further, it will be recognized that the user modules 301 can be a combination of text-based and/or graphical-based modules 301, as desired.

As previously described, the user modules 301 are not directly aware of the design-time model 308. Generally, the user module 301 creates a command to change the design-time model 308 so that the change can be undone through an undo API (not shown). The user module 301 can be configured with an EMF core object called an editing domain that maintains a command stack. The editing domain uses the adapter factory to find an adapter that can create the command. The generated adapter class (ItemProvider) creates the command. The user module 301 executes the command by using the command stack. Further, because the ItemProvider is a notification observer it is notified when the design-time model 308 changes. The ItemProvider in turn notifies a corresponding provider. The provider instructs the user module 301 to refresh after a change notification.

The script editor is a constrained text editor for providing relationships between application components. Typically, this information is provided as part of the workflow component. Some commands, such as creating functions, can be restricted such that they are not user-definable in the component application. Accordingly, when a function is created, the events generated by the script editor are fixed. Other commands, such as SavesSript for example, may be edited by the script editor 406. SaveScript is used when the user saves a script of the application. In the present embodiment, SaveScript triggers the design-time model 308 events NavigationChanged, LocalizedStringChanged and ExitCodeChanged, if successful.

Further, the script editor can react to events. For example, ComponentRemoved indicates whether a removed component affects input parameters to the script or globals used by the script. If the removed component affects the script, the script editor prompts the user of the design tool 216 that the script is invalid.

A sample interface of the script editor extends the org.eclipse.ui.editors extension point of the Eclipse framework by implementing a subclass of the org.eclipse.ui.editors.texteditors hierarchy. The design tool 216 coordinates the creation and/or modification of scripts in the components as well as the inter-relation of the script affecting other associated components of the application.

The screen editor 408 facilitates creation and modification of the structured definition language code in the screen components associated with display of data on the device 102. UI controls for inclusion in the screen components can be dropped onto a form canvas in the editor. Control properties, including event handlers, can be edited by the screen editor 408.

Sample commands that can be edited by the screen editor 408 include the following commands. ButtonChange is sent to the design-time model 308 when the developer changes a button control. This command triggers NavigationControlChanged of the design-time model 308 if successful. MenuItemChange is sent when the developer changes a menu item. This command triggers NavigationControlChanged of the design-time model 308 if successful. ChangeScript is sent when the developer changes a script. This command triggers NavigationControlChanged of the design-time model 308 if successful. QueryMessages is sent when the developer needs a list of available messages that the screen of the application may send or refresh, and returns a list of available messages. QueryData is sent when the developer needs a list of available data objects to bind controls to, and returns a list of available data. NonNavigationControlChange is sent when a control that does not affect navigation has been modified. DataBindingChange is sent when a data binding has changed. This command triggers DataBindingChanged and ScreenParameterListChanged of the data model 308 if successful.

Sample input events to the screen editor 408 include the following. An event ComponentRemoved informs the screen editor that a component to which a screen component refers has been removed. An event ComponentRenamed is similar to ComponentRemoved. An event ScreenParameterListChanged modifies the screen component if a parameter used has been modified. The screen component either adjusts that parameter or warns the developer that those dependencies are no longer valid and must be changed. An event MessageFieldChanged checks to see if a field in question is used by the screen component. An event DataFieldChanged checks to see if any controls bound to the field(s) have changed and warns the developer accordingly.

A sample interface of the screen editor 408 extends org.eclipse.ui.editors of the Eclipse framework using the GEF GraphicalEditor and/or a VE editor. The design tool 216 coordinates the creation and/or modification of screen definitions in the screen components as well as the inter-relation of the screen definitions affecting other associated components of the application.

The data editor 410 facilitates creation and modification of the structured definition language code in the data components of the application by providing the developer the ability to edit data component fields and properties. New data objects can be created from scratch, by prototyping existing data objects or based on data definition mappings to message objects in message components.

Sample commands editable by the data editor 410 include the following. AddRemoveFields is sent when the developer adds or removes a field from a data object definition. This command triggers DataFieldChanged of the data model 308 if successful. LinkToExternalData is sent when the developer links a data object definition to an external data object, such as a Calendar or Contacts data object for example. This command triggers DataFieldChanged of the data model 308 if successful.

Sample input events to the data editor 410 include the following. An event ComponentRemoved checks to see if a removed object was related to a message through prototyping or containment. The developer can then adjust the fields contained in the data object affected. An event ComponentRenamed is similar to ComponentRemoved.

A sample interface of the screen editor 408 extends org.eclipse.ui.editors using the GEF GraphicalEditor. The design tool 216 coordinates the creation and/or modification of data definitions in the data components as well as the inter-relation of the data definitions and associated screen/message definitions affecting other associated components of the application.

The message editor 412 facilitates creation and modification the structured definition language code in the message components of the application. The message designer allows a developer to create and edit message components for sending messages to and receiving messages from back-end servers 108. These messages can include both request/response pairs as well as subscribe/notify/unsubscribe notification messages. Message definitions can be created by prototyping existing messages or by templates based on back-end services of the back-end servers 106. Further, the message editor provides the ability to select a reliability level for the message. The reliability level defines how the message is to be handled at the device 102 and the application gateway 106, including delivery, acknowledgement and persistence. The message reliability can be set by an appropriate UI input mechanism such as a drop down menu or radio button selection. The message reliability can be set on a per message or per application level.

Sample commands that can be edited by the message editor 412 include AddRemoveFields, which is sent when a field is added to or remove from a message in a message component. Sample input events to the message editor 412 include the following. An event ComponentRemoved checks to see if a component that referenced the message definition has been removed. An event ComponentRenamed is similar to ComponentRemoved. An event FieldMappingChanged checks to see if a field mapping effects the message definitions being edited.

A sample interface of the screen editor 408 extends org.eclipse.ui.editors using the GEF GraphicalEditor. The design tool 216 coordinates the creation and/or modification of message definitions in the message components as well as the inter-relation of the created/modified message affecting other associated components of the application.

The workflow editor 402 facilitates creating and modifying the command code in the workflow components of the application. The workflow editor 402 defines the screen-to-screen transitions that form the core of the visual part of the component application. Screens and transitions between screens due to user/script events are rendered visually.

Sample commands that can be edited by the workflow editor 402 include the following. QueryScreens is sent when the developer wants a list of screens to select from, such as when adding a new screen to the workflow. QueryScripts is sent when the developer wants a list of scripts to call on a screen navigation event. QueryArrivingMessages is sent when the developer wants a list of response messages (including notifications) on which to key screen transitions. AddComponent is sent when the developer wants to add a new screen, message or script to the workflow that doesn't already exist in the workflow. This command triggers ComponentAdded of the data model 308 if successful. ChangeNavigation is sent when the developer adds a new navigation to the workflow. This command triggers NavigationChanged of the design-time model 308 if successful.

Sample input events to the workflow editor 402 include the following. An event ComponentRemoved checks to see if a removed component is a workflow object. The Workflow updates itself by deleting all relationships with this object definition. An event ComponentRenamed checks to see if a renamed component is a workflow object. The workflow updates its view with the new name of the component. An event NavigationControlChanged checks to see if the workflow needs to update its view of the navigation node based on a control change. If, for example, a button has been added to a screen in the workflow, then the view is updated to show the availability of a new navigation node on that screen. An event ScreenParameterListChanged checks to see if a screen's parameter list has changed and if the screen is in the workflow. The view of any navigation node involving that screen is updated. An event NavigationChanged checks to see if a possible navigation change has occurred. The change is parsed and any necessary updates are made to the view. An event ExitCodeChanged checks to see if an exit point has been added/removed. The editor view is updated to reflect this visually.

A sample interface of the screen editor 408 extends org.eclipse.ui.editors using the GEF GraphicalEditor.

The message editor 404 facilitates creating and modifying the structured definition language code in the inter-related message and data components of the application. The message/data relationship editor creates and edits relationships between message components and data components. These mappings effect how a data component is populated on message arrival at the device 102 when running the application. For example, data object definitions common between data and message components can exist such that the data object definitions are resident in the data component, while a data mapping definition links the message component to the data object definition in the data component is resident in the message component, or vice versa. A similar configuration can be employed for data object definitions common between screen and data components, whereby the data object definition is resident in one of the components and the data mapping definition is resident in the other associated component.

Sample commands that can be edited by the editor 404 include the following. AddComponent is sent when a new data or message is added to the relationship diagram with the effect of also adding that component to the application being developed. This command triggers ComponentAdded of the design-time model 308 if successful. QueryMessages is sent when the developer needs a list of Messages to map. QueryData is sent when the developer needs a list of data to map. ChangeMessageLevelMapping is sent when the developer changes a message-level mapping. This command triggers FieldMappingChanged of the data model 308 if successful. ChangeFieldLevelMapping is sent when the developer changes a field-level mapping. This command triggers FieldMappingChanged of the data model 308 if successful. ChangePrototype is sent when the developer changes a prototype relationship between data objects. This command triggers FieldMappingChanged of the data model 308 if successful. ChangeContainment is sent when the developer changes a containment relationship between data objects. This command triggers MessageContainmentChanged of the data model 308 if successful.

Sample input events to the editor 404 include the following. An event ComponentRemoved checks to see if the object removed was a message or data. The relationship mapper deletes any relationships involving the removed object. An event ComponentRenamed checks to see if the renamed object is involved in any mapping relationships. The visual representation of the mapped object is updated with the new name. An event MessageFieldChanged checks to see if the message involved is present in the relationship editor. The field change is then reflected in the visual representation of the message. If the field in question is involved in a mapping, then changes are reflected and the developer may need to be warned of broken mappings if applicable. An event DataFieldChanged is similar to MessageFieldChanged except using data instead of messages.

An sample interface of the editor 404 extends org.eclipse.ui.editors using the GEF GraphicalEditor. The design tool 216 coordinates the creation and/or modification of message/data definitions in the message/data components as well as the inter-relation of the created/modified message/data definitions affecting other associated components of the application.

The localization editor 414 allows the developer to collect all strings that will be visible to the application end-user (of the device 100) and edit them in one place. The editor 414 also allows the developer to create multiple resource mappings for each string into different languages. A sample command that can be edited by the editor 414 includes ChangeLocalizeString, which is sent when the developer adds, deletes or modifies a localized string. A sample input event to the editor 414 includes an event LocalizedStringChanged, which is used to determine when a string literal has been changed in the script editor or a label has changed in the screen editor 408. The localization editor 414 can extend the org.eclipse.ui.editors interface by extending an EditorPart.

The back-end visualizer editor 416 shows the developer the relationships between message components and the back-end servers that drive the components. The editor 416 also allows the developer to add new back-end servers to the list of those supported by the application in development. In addition to interaction with the design-time data model 308, as is described for other modules 301 using commands and events received, the Back-end Visualizer editor 416 collaborates with the back-end connector. The back-end connector 316 allows the visualizer to request a ServicesInterface from a registry of known service types. A list of services of this type is returned that can queried by name or by iteration.

Sample commands that can be edited by the editor 416 include the following. AddComponent is sent when the developer adds a new message. This command triggers ComponentAdded of the data model 308 if successful. SpecifyMapping is sent when the developer connects a message to a selected back-end server 108.

Sample input events to the editor 416 include the following. An event ComponentRemoved checks to see if the component is a message. The back-end visualizer adjusts its mappings for that message. An event ComponentRenamed is similar to ComponentRemoved. An event MessageFieldChanged validates the message field against what exists on the back-end server 108 and notifies the developer visually of any broken mappings. Back-end servers 108 are accessed through direct calls to the service layers. Optionally, background processing may be used to keep network processing from blocking UI threads. The Editor 416 can extend the org.eclipse.ui.editors using the GEF GraphicalEditor.

Figure 5:
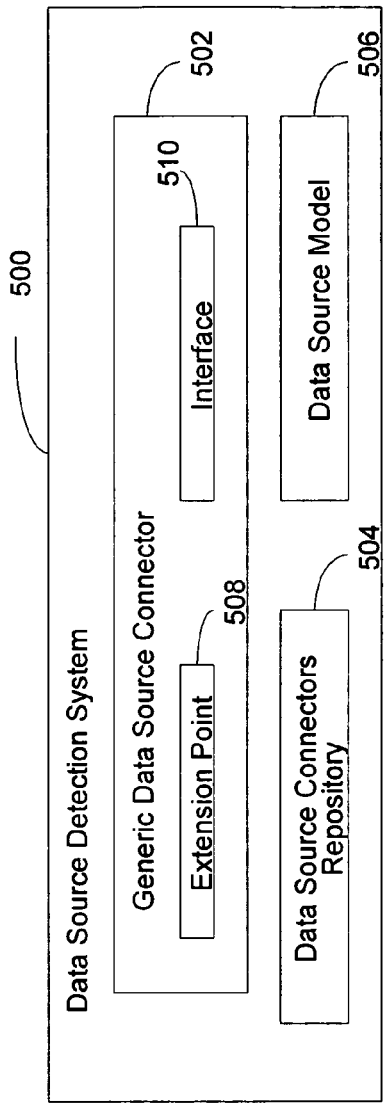
FIG. 5 shows an example of a data source detection system for detecting registered data source connectors, in accordance with an embodiment of the present patent disclosure.

A methodology and a tool for automatically discovering different data source connectors 316 (i.e., one for databases, one for Web services, etc.) in a generic way will now be described. FIG. 5 shows an example of a data source detection system 500 for detecting registered data source connectors 316, in accordance with an embodiment of the present patent disclosure. Typically, one connector 316 is developed for each data source type, that is, one database connector, one Web service connector, etc. The data source information is represented as a WSDL-like model.

The data source detection system 500 comprises a generic data source connector 502 for connecting to multiple and diverse data source connectors 316, a data source connectors repository 504 for storing the location (e.g., URL) of one or more data sources 106, and a data source model (or structure) 506 for representing information contained in data sources 106. The connectors 316 to these objects are dynamically retrieved by introspecting the data source connectors repository 504. The generic data source connector 502 includes an extension point 508 (a named marker) for defining possible extensibility for implementing data source connectors 316 and providing these particular connectors 316 (Web services connector, database connector, etc.) with a criterion to be retrieved by the data source detection system 500 through dynamic introspection (or dynamic discovery) of the data source connectors repository 504, and one or more generic interfaces 510 for defining the "contract" for data source connectors 316. "Contract" means a common interface provided by the generic data source connector 502, which every data source connector 316 a particular type of data source 106 (e.g., Web services, databases, etc.) is bound to observe/ implement.

This data source detection system 500 can generate the mobile application model based on the discovered data source schema. A common WSDL-like model (or data source model 506) is used for internally representing any data source information. Based on this common model of a data source 106, the data source detection system 500 generates a mobile application model. A transformation to the serialized model of the mobile application will produce mapping information for the Application Gateway and application definition for the device 100.

Instead of developing data source-specific access logic in the design tool 216, various data source connectors 316 can be developed either by the creator of the wireless application or by a third party. Preferably, these connectors 316 implement a given generic interface, and the design tool 216 discovers the existing connectors in an Eclipse repository. After discovery, the selected data source connector 316 is used subsequently for retrieving the data from the data source 106 represented as a common WSDL-like model 506 for building the model of the wireless application. The discovery tool (in one embodiment a data source detection system 500) is integrated in the design tool 216, but the specific connectors do not have to be part of the design tool 216; they can reside as different plug-ins (e.g., but not limited to Eclipse plug-ins), in a common plug-in architecture. For example, in one embodiment of a design tool 216, a database connector and a Web service connector can be different plug-ins (both included in the design tool 216, but external to the plug-in representing a data source detection system 500). Preferably, these connectors are included as components.

Figure 6:
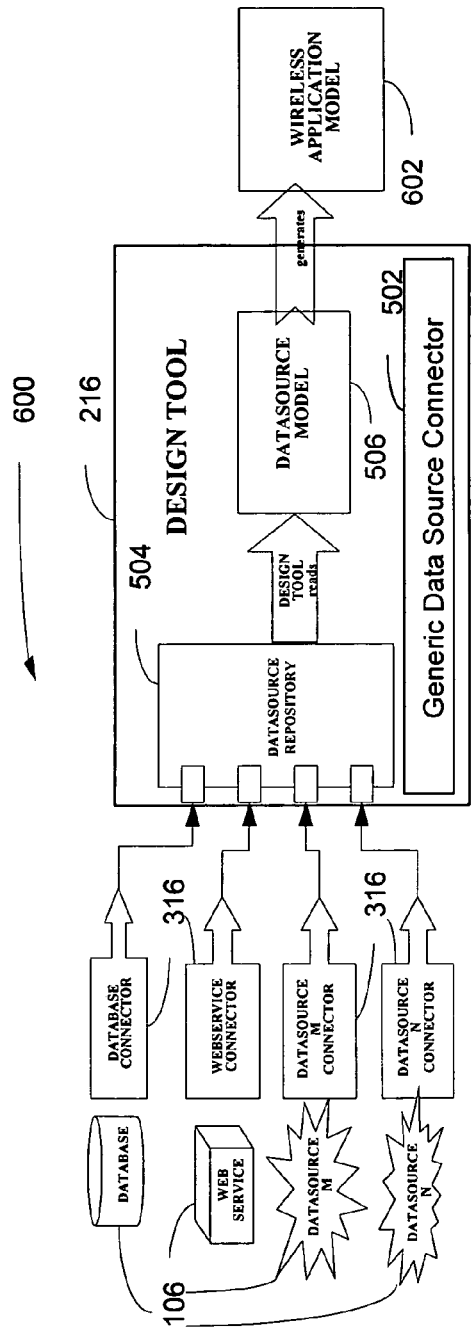
FIG. 6 shows an example of the discovery of data source connectors (plug-ins) environment, in accordance with an embodiment of the data source detection system.

FIG. 6 shows an example of the discovery of data source connectors 316 (plug-ins) environment 600, in accordance with the embodiment of the data source detection system 500. The environment 600 comprises data sources 106 (i.e., database, Web service, data source M, data source N), the data source connectors 316, and the design tool 216. The design tool 216 comprises the data source detection system 500 and the data source model 506. The design tool 216 reads the data source model 506 and generates the wireless application model 602. The data source detection system 500 uses the generic data source connector 502 for introspecting the data source connectors repository 504 and reading the data source information represented by the data source model 506.

The connectors for various data sources 106 (e.g., databases, Web services, etc.) can be developed by wireless application developers, by data source providers or by third parties. Those connectors 316 are built as plug-ins (e.g., Eclipse plug-ins, but other platforms can be used as well), deployed in a plug-in repository so that the design tool 216 can automatically detect them. Preferably, one plug-in per data source type will be developed (i.e., one database connector, one Web service connector, etc.).

Preferably, the plug-ins observe the following rules:
1. A generic data source connector 316 is built and deployed. This generic connector 316 provides the "contract" 510 for all data source specific connectors 316.
2. The generic connector plug-in 502 defines an extension point 508 (in one embodiment of an implementation: "backends"—see schema for the generic connector below).
3. The generic connector 502 exposes two interfaces 510, which are implemented by any of the specific data source connectors 316. An example of the description of these interfaces is provided below.
4. The specific data source connectors 316 extend the extension points 508 defined by the generic connector 502.
5. The URL of the data source 106 (i.e., database, Web service, etc.) is a common property defined in the generic connector 502.
6. The specific data source connectors 316 define in their implementation additional properties (e.g., credentials and other specific data source properties).
7. The generic connector 502 and the specific data source connectors 316 are deployed as plug-ins in a repository (e.g., Eclipse plug-in repository) accessible to the design tool 216 through dynamic discovery. "Dynamic Discovery" means the introspection of the data source connectors repository 504 by the data source detection system 500 for retrieving the information about a specific data source represented by the data source model 506.
8. The information contained in any data source 106 is represented in a common WSDL-like model 506 (see the example of a WSDL-like model schema described below).

Examples of the interfaces 510 ("the contract") defined by the generic data source connector include:
11. The interface IConnectorInfo defines the URL of the data source 106. This is a common property to all the data source types.
12. The interface IConnector defines the common WSDL-like model 506 (with the root named DocumentRoot in the model's schema) and an IConnectorInfo set of common data source properties.

Preferably data source-specific connectors 316 implement the two above interfaces 510 (contracts) and can define their specific properties by adding these properties in their implementation of the IConnectorInfo interface (in one embodiment, implemented as a JavaBean containing the URL as a common property and a set of additional properties). These data source-specific properties are discovered automatically by the design tool 216 through introspection. An example of a schema for the generic connector 316 is presented below. This example schema is based on the specifications of Eclipse Plugin Development Environment (PDE). Other schemas may be created using different PDE specifications.

```
<?xml version='1.0' encoding='UTF-8'?>
<!-- Schema file written by PDE -->
<schema
targetNamespace="net.rim.wica.tools.studio.datasource.connector
">
   <annotation>
      <appInfo>
         <meta.schema
plugin="net.rim.wica.tools.studio.datasource.connector"
id="backends" name="backends"/>
      </appInfo>
      <documentation>
         [Enter description of this extension point.]
      </documentation>
   </annotation>
   <element name="extension">
      <complexType>
         <sequence>
            <element     ref="backend"     minOccurs="0"
maxOccurs="10"/>
         </sequence>
```

```
        <attribute name="point" type="string" use="required">
            <annotation>
                <documentation>
                </documentation>
            </annotation>
        </attribute>
        <attribute name="id" type="string">
            <annotation>
                <documentation>
                </documentation>
            </annotation>
        </attribute>
        <attribute name="name" type="string">
            <annotation>
                <documentation>
                </documentation>
            </annotation>
        </attribute>
    </complexType>
</element>
<element name="backend">
    <complexType>
        <attribute name="id" type="string">
            <annotation>
                <documentation>
                </documentation>
            </annotation>
        </attribute>
        <attribute name="description" type="string" use="required">
            <annotation>
                <documentation>
                </documentation>
            </annotation>
        </attribute>
        <attribute name="class" type="string">
            <annotation>
                <documentation>
                </documentation>
                <appInfo>
                    <meta.attribute kind="java" basedOn="net.rim.wica.tools.studio.datasource.connector.IConnector"/>
                </appInfo>
            </annotation>
        </attribute>
        <attribute name="backendType">
            <annotation>
                <documentation>
                </documentation>
            </annotation>
            <simpleType>
                <restriction base="string">
                    <enumeration value="webservice">
                    </enumeration>
                    <enumeration value="database">
                    </enumeration>
                    <enumeration value="corba">
                    </enumeration>
                    <enumeration value="legacy">
                    </enumeration>
                </restriction>
            </simpleType>
        </attribute>
    </complexType>
</element>
<annotation>
    <appInfo>
        <meta.section type="since"/>
    </appInfo>
    <documentation>
        [Enter the first release in which this extension point appears.]
    </documentation>
</annotation>
<annotation>
    <appInfo>
        <meta.section type="examples"/>
    </appInfo>
    <documentation>
        [Enter extension point usage example here.]
    </documentation>
</annotation>
<annotation>
    <appInfo>
        <meta.section type="apiInfo"/>
    </appInfo>
    <documentation>
        [Enter API information here.]
    </documentation>
</annotation>
<annotation>
    <appInfo>
        <meta.section type="implementation"/>
    </appInfo>
    <documentation>
        [Enter information about supplied implementation of this extension point.]
    </documentation>
</annotation>
<annotation>
    <appInfo>
        <meta.section type="copyright"/>
    </appInfo>
    <documentation>
    </documentation>
</annotation>
</schema>
```

Figure 7:
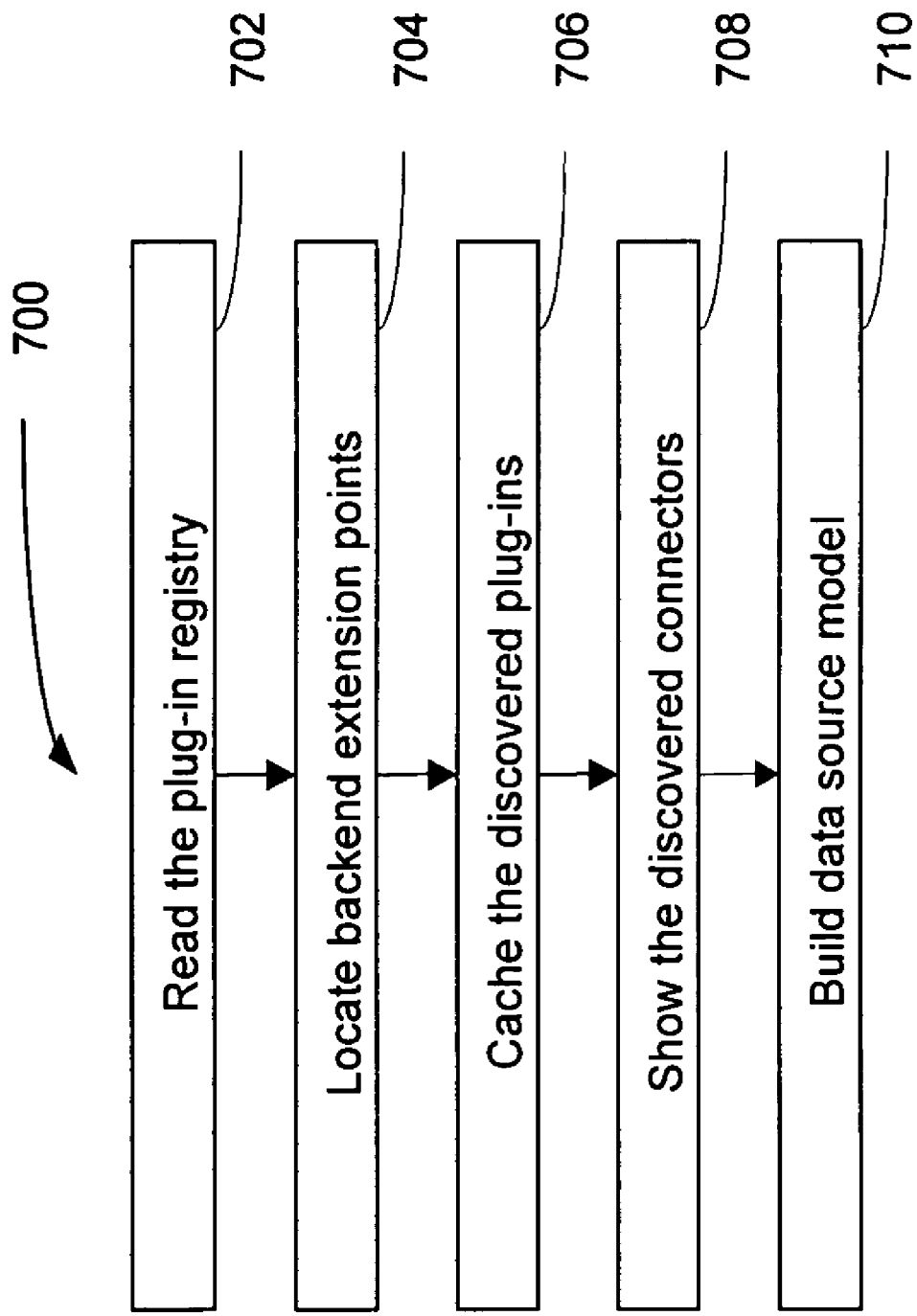
FIG. 7 shows in a flowchart an example of a method of data source detection, in accordance with an embodiment of the data source detection system.

The design tool 216 discovers the registered plug-ins-data source connectors 316 and, upon a user's choice, connects to that particular data source 316 and builds up the WSDL-like model 506 of the data source 106. This process is depicted in the logical schema shown in FIG. 7. FIG. 7 shows in a flowchart an example of a method of data source detection (700), in accordance with an embodiment of the data source detection system 500. The method (700) begins with reading the plug-in registry (or repository 504) (702) and locating plug-in extending "backends" extension points (704). Preferably, for performances reasons, the design tool 216 caches the discovered plugins (706). The design tool 216 shows the discovered connectors 316 (708) and prompts the user to choose from a specific data source type 106 (e.g., databases, Web services, etc), upon the discovered connectors 316. The design tool 216 builds the WSDL-like model 506 of the data source 106 (710). This model is used for building up the wireless application model 602.

A common model 506 is used for representing various data sources 106. This model 506 represents in a WSDL-like structure the data source information discovered by the data source detection system 500 in order to create the wireless application model 602. Preferably, the Web services are natively represented by this model 506, but any other data source 106 (e.g., databases, CORBA applications, etc.) can be modeled by this WSDL-like structure, by using annotation for describing data source specific information. An example of the WSDL-like model 506 schema is presented below.

```xml
<?xml version="1.0" encoding="UTF-8"?>
<xsd:schema xmlns:xsd="http://www.w3.org/2001/XMLSchema"
xmlns:wsdl="http://schemas.xmlsoap.org/wsdl/"
targetNamespace="http://schemas.xmlsoap.org/wsdl/">
<xsd:simpleType name="MsgTypes">
<xsd:restriction base="xsd:NCName">
<xsd:enumeration value="none"/>
<xsd:enumeration value="input"/>
<xsd:enumeration value="output"/>
<xsd:enumeration value="header"/>
<xsd:enumeration value="input_header"/>
<xsd:enumeration value="output_header"/>
<xsd:enumeration value="fault"/>
</xsd:restriction>
</xsd:simpleType>
<xsd:complexType name="DocumentRoot">
<xsd:sequence>
<xsd:element minOccurs="0" maxOccurs="unbounded" name="mixed"
nillable="true" type="xsd:string"/>
</xsd:sequence>
<xsd:attribute name="arrayType" type="xsd:string"/>
<xsd:attribute name="required" type="xsd:string"/>
</xsd:complexType>
<xsd:element name="DocumentRoot" type="wsdl:DocumentRoot"/>
<xsd:complexType name="TBinding">
<xsd:complexContent>
<xsd:extension base="wsdl:TExtensibleDocumented">
<xsd:sequence>
<xsd:element minOccurs="0" maxOccurs="unbounded"
name="operation" type="wsdl:TBindingOperation"/>
</xsd:sequence>
<xsd:attribute name="name" type="xsd:string"/>
<xsd:attribute name="type" type="xsd:string"/>
</xsd:extension>
</xsd:complexContent>
</xsd:complexType>
<xsd:element name="TBinding" type="wsdl:TBinding"/>
<xsd:complexType name="TBindingOperation">
<xsd:complexContent>
<xsd:extension base="wsdl:TExtensibleDocumented">
<xsd:sequence>
<xsd:element minOccurs="0" maxOccurs="1" name="input"
type="wsdl:TBindingOperationMessage"/>
<xsd:element minOccurs="0" maxOccurs="1" name="output"
type="wsdl:TBindingOperationMessage"/>
<xsd:element minOccurs="0" maxOccurs="unbounded" name="fault"
type="wsdl:TBindingOperationFault"/>
</xsd:sequence>
<xsd:attribute name="name" type="xsd:string"/>
</xsd:extension>
</xsd:complexContent>
</xsd:complexType>
<xsd:element name="TBindingOperation"
type="wsdl:TBindingOperation"/>
<xsd:complexType name="TBindingOperationFault">
<xsd:complexContent>
<xsd:extension base="wsdl:TExtensibleDocumented">
<xsd:attribute name="name" type="xsd:string"/>
</xsd:extension>
</xsd:complexContent>
</xsd:complexType>
<xsd:element name="TBindingOperationFault"
type="wsdl:TBindingOperationFault"/>
<xsd:complexType name="TBindingOperationMessage">
<xsd:complexContent>
<xsd:extension base="wsdl:TExtensibleDocumented">
<xsd:attribute name="name" type="xsd:string"/>
</xsd:extension>
</xsd:complexContent>
</xsd:complexType>
<xsd:element name="TBindingOperationMessage"
type="wsdl:TBindingOperationMessage"/>
<xsd:complexType name="TDefinitions">
<xsd:complexContent>
<xsd:extension base="wsdl:TExtensibleDocumented">
<xsd:sequence>
<xsd:element minOccurs="0" maxOccurs="unbounded" name="group"
nillable="true" type="xsd:string"/>
</xsd:sequence>
```

-continued

```
<xsd:attribute name="name" type="xsd:string"/>
<xsd:attribute name="targetNamespace" type="xsd:string"/>
</xsd:extension>
</xsd:complexContent>
</xsd:complexType>
<xsd:element name="TDefinitions" type="wsdl:TDefinitions"/>
<xsd:complexType name="TDocumentation">
<xsd:sequence>
<xsd:element minOccurs="0" maxOccurs="unbounded" name="mixed"
nillable="true" type="xsd:string"/>
</xsd:sequence>
</xsd:complexType>
<xsd:element name="TDocumentation"
type="wsdl:TDocumentation"/>
<xsd:complexType name="TDocumented">
<xsd:annotation>
<xsd:documentation>
    This type is extended by component types to allow them
to be documented
    </xsd:documentation>
</xsd:annotation>
<xsd:sequence>
<xsd:element minOccurs="0" maxOccurs="1" name="documentation"
type="wsdl:TDocumentation"/>
</xsd:sequence>
</xsd:complexType>
<xsd:element name="TDocumented" type="wsdl:TDocumented">
<xsd:annotation>
<xsd:documentation>
    This type is extended by component types to allow them
to be documented
    </xsd:documentation>
</xsd:annotation>
</xsd:element>
<xsd:complexType name="TExtensibilityElement">
<xsd:attribute name="required" type="xsd:string"/>
</xsd:complexType>
<xsd:complexType name="TExtensibleAttributesDocumented">
<xsd:annotation>
<xsd:documentation>
        This type is extended by component types to allow
attributes from other namespaces to be added.
        </xsd:documentation>
</xsd:annotation>
<xsd:complexContent>
<xsd:extension base="wsdl:TDocumented">
<xsd:sequence>
<xsd:element minOccurs="0" maxOccurs="unbounded"
name="anyAttribute" nillable="true" type="xsd:string"/>
</xsd:sequence>
</xsd:extension>
</xsd:complexContent>
</xsd:complexType>
<xsd:complexType name="TExtensibleDocumented">
<xsd:annotation>
<xsd:documentation>
        This type is extended by component types to allow
elements from other namespaces to be added.
        </xsd:documentation>
</xsd:annotation>
<xsd:complexContent>
<xsd:extension base="wsdl:TDocumented">
<xsd:sequence>
<xsd:element minOccurs="0" maxOccurs="unbounded" name="any"
nillable="true" type="xsd:string"/>
</xsd:sequence>
</xsd:extension>
</xsd:complexContent>
</xsd:complexType>
<xsd:complexType name="TFault">
<xsd:complexContent>
<xsd:extension base="wsdl:TExtensibleAttributesDocumented">
<xsd:attribute name="message" type="xsd:string"/>
<xsd:attribute name="name" type="xsd:string"/>
</xsd:extension>
</xsd:complexContent>
</xsd:complexType>
<xsd:element name="TFault" type="wsdl:TFault"/>
<xsd:complexType name="TImport">
```

-continued

```
<xsd:complexContent>
<xsd:extension base="wsdl:TExtensibleAttributesDocumented">
<xsd:attribute name="location" type="xsd:string"/>
<xsd:attribute name="namespace" type="xsd:string"/>
</xsd:extension>
</xsd:complexContent>
</xsd:complexType>
<xsd:element name="TImport" type="wsdl:TImport"/>
<xsd:complexType name="TMessage">
<xsd:complexContent>
<xsd:extension base="wsdl:TExtensibleDocumented">
<xsd:sequence>
<xsd:element minOccurs="0" maxOccurs="unbounded" name="part" type="wsdl:TPart"/>
</xsd:sequence>
<xsd:attribute name="name" type="xsd:string"/>
</xsd:extension>
</xsd:complexContent>
</xsd:complexType>
<xsd:element name="TMessage" type="wsdl:TMessage"/>
<xsd:complexType name="TOperation">
<xsd:complexContent>
<xsd:extension base="wsdl:TExtensibleDocumented">
<xsd:sequence>
<xsd:element minOccurs="0" maxOccurs="1" name="input" type="wsdl:TParam"/>
<xsd:element minOccurs="0" maxOccurs="1" name="output" type="wsdl:TParam"/>
<xsd:element minOccurs="0" maxOccurs="unbounded" name="fault" type="wsdl:TFault"/>
<xsd:element minOccurs="0" maxOccurs="1" name="output1" type="wsdl:TParam"/>
<xsd:element minOccurs="0" maxOccurs="1" name="input1" type="wsdl:TParam"/>
<xsd:element minOccurs="0" maxOccurs="unbounded" name="fault1" type="wsdl:TFault"/>
</xsd:sequence>
<xsd:attribute name="name" type="xsd:string"/>
<xsd:attribute name="parameterOrder" type="xsd:string"/>
</xsd:extension>
</xsd:complexContent>
</xsd:complexType>
<xsd:element name="TOperation" type="wsdl:TOperation"/>
<xsd:complexType name="TParam">
<xsd:complexContent>
<xsd:extension base="wsdl:TExtensibleAttributesDocumented">
<xsd:attribute name="message" type="xsd:string"/>
<xsd:attribute name="name" type="xsd:string"/>
</xsd:extension>
</xsd:complexContent>
</xsd:complexType>
<xsd:element name="TParam" type="wsdl:TParam"/>
<xsd:complexType name="TPart">
<xsd:complexContent>
<xsd:extension base="wsdl:TExtensibleAttributesDocumented">
<xsd:attribute name="element" type="xsd:string"/>
<xsd:attribute name="name" type="xsd:string"/>
<xsd:attribute name="type" type="xsd:string"/>
</xsd:extension>
</xsd:complexContent>
</xsd:complexType>
<xsd:element name="TPart" type="wsdl:TPart"/>
<xsd:complexType name="TPort">
<xsd:complexContent>
<xsd:extension base="wsdl:TExtensibleDocumented">
<xsd:attribute name="binding" type="xsd:string"/>
<xsd:attribute name="name" type="xsd:string"/>
</xsd:extension>
</xsd:complexContent>
</xsd:complexType>
<xsd:element name="TPort" type="wsdl:TPort"/>
<xsd:complexType name="TPortType">
<xsd:complexContent>
<xsd:extension base="wsdl:TExtensibleAttributesDocumented">
<xsd:sequence>
<xsd:element minOccurs="0" maxOccurs="unbounded" name="operation" type="wsdl:TOperation"/>
</xsd:sequence>
<xsd:attribute name="name" type="xsd:string"/>
```

-continued

```
</xsd:extension>
</xsd:complexContent>
</xsd:complexType>
<xsd:element name="TPortType" type="wsdl:TPortType"/>
<xsd:complexType name="TService">
<xsd:complexContent>
<xsd:extension base="wsdl:TExtensibleDocumented">
<xsd:sequence>
<xsd:element minOccurs="0" maxOccurs="unbounded" name="port" type="wsdl:TPort"/>
</xsd:sequence>
<xsd:attribute name="name" type="xsd:string"/>
</xsd:extension>
</xsd:complexContent>
</xsd:complexType>
<xsd:element name="TService" type="wsdl:TService"/>
<xsd:complexType name="TTypes">
<xsd:complexContent>
<xsd:extension base="wsdl:TExtensibleDocumented"/>
</xsd:complexContent>
</xsd:complexType>
<xsd:element name="TTypes" type="wsdl:TTypes"/>
<xsd:complexType name="HParam">
<xsd:complexContent>
<xsd:extension base="wsdl:TParam"/>
</xsd:complexContent>
</xsd:complexType>
<xsd:element name="HParam" type="wsdl:HParam"/>
</xsd:schema>
```

The data source detection system and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. An application design tool for developing a wireless application model of a component based wireless application, the component application including data components, message components, presentation components and workflow components for execution on a wireless device, the application design tool implemented in a computer having a processor for executing instructions stored in a computer readable memory, the executed instructions providing:

a data source detection system comprising:
      a data source connectors repository for storing:
         a plug-in defining a generic data source connector comprising:
            an extension point for providing criterion for identifying specific data source connectors, and
            a contract defining a common interface to be used by specific data source connectors;
         one or more specific data source connectors, each implementing the contract for a particular type of data source and comprising a data source schema defining a Web Services Description Language (WSDL)-like model of the particular type of data source; and
      a data source model for representing information contained in data sources generated from the WSDL-like model of the particular type of data source retrieved from the data source connector repository by dynamically introspecting the data source connector repository using the criterion of the extension point of the plug-in; and
      a wireless application model using the data source model based on the data source schema for a data source retrieved using the specific data source connector associated with the particular type of data source, the data source schema for creating the data source model for building the wireless application model.

2. The data source detection system as claimed in claim 1, wherein the contract further includes an IConnectorInfo interface to enable the defining of a URL of the data source.

3. The data source detection system as claimed in claim 1, wherein the common interface includes an IConnector interface for defining the data source model and a set of common data source properties.

4. A method of developing a wireless application model of a component based wireless application for execution on a wireless device, the method comprising the steps of:

reading a data source connector repository storing:
      a plug-in defining a generic data source connector comprising:
         an extension point for providing criterion for identifying specific data source connectors, and
         a contract defining a common interface to be used by specific data source connectors;
      one or more specific data source connectors each implementing the contract for a particular type of data source and comprising a data source schema defining a Web Services Description Language (WSDL)-like model of the particular type of data source;

dynamically introspecting the data source connector repository using the criterion of the extension point of the plug-in connector to identify the one or more specific data source connectors;

retrieving a data source schema for a data source using the specific data source connector associated with the particular type of data source; and building a data source model of the data source for generating the wireless application model using the retrieved data source schema.

5. The method as claimed in claim 4, further comprising the step of caching the identified one or more specific data source connectors.

6. The method as claimed in claim 4, further comprising the steps of:

display a plurality of discovered one or more specific data source connectors; and prompting a user to choose from one of the displayed specific data source connectors.

7. A computer-readable medium storing instructions or statements for use in the execution in a computer of a method of developing a wireless application model of a component based wireless application for execution on a wireless device, the method comprising the steps of:

reading a data source connector repository storing:

a plug-in defining a generic data source connector comprising:

an extension point for providing criterion for identifying specific data source connectors, and a contract defining a common interface to be used by specific data source connectors;

one or more specific data source connectors each implementing the contract for a particular type of data source and comprising a data source schema defining a Web Services Description Language (WSDL)-like model of the particular type of data source;

dynamically introspecting the data source connector repository using the criterion of the extension point of the plug-in connector to identify the one or more specific data source connectors;

retrieving a data source schema for a data source using the specific data source connector associated with the particular type of data source; and building a data source model of the data source for generating the wireless application model using the retrieved data source schema.

* * * * *